(No Model.)
T. F. MOSS.
FUMIGATING APPARATUS.
No. 571,784. Patented Nov. 24, 1896.
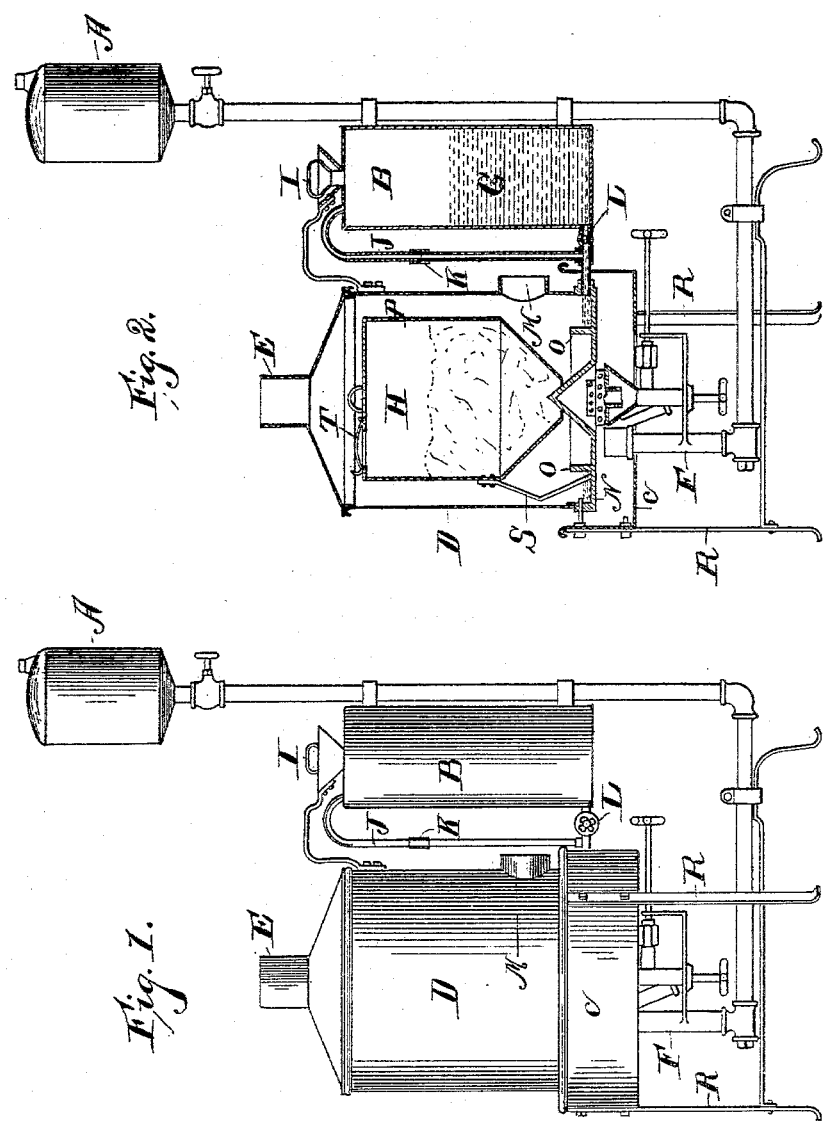

UNITED STATES PATENT OFFICE.

THOMAS F. MOSS, OF HUDSON, WISCONSIN.

FUMIGATING APPARATUS.

SPECIFICATION forming part of Letters Patent No. 571,784, dated November 24, 1896.

Application filed July 1, 1895. Serial No. 554,623. (No model.)

*To all whom it may concern:*

Be it known that I, THOMAS F. MOSS, a citizen of the United States, residing at Hudson, in the county of St. Croix and State of Wisconsin, have invented certain new and useful Improvements in Fumigating Apparatus, of which the following is a specification.

My invention relates to fumigation; and the object and nature of my invention are to provide a new and suitable device for disinfecting rooms, buildings, clothing, &c., and for killing bacteria, disease germs, and insects, &c., by means of heat, gaseous fumes, and moisture.

In the accompanying drawings I have illustrated one preferred embodiment of my present invention.

Figure 1 is a side elevation of a fumigating apparatus embodying my improvements. Fig. 2 is a similar view showing portions of the apparatus in vertical section.

In the drawings, A designates a tank or receptacle for liquid fuel, such as gasolene, which is connected by a suitably-valved pipe with a burner F. These parts may be of any suitable and desired style, and any other form of heater may be substituted for that herein illustrated without departing from the present invention.

D designates a casing within which the disinfecting fumes are produced. This casing and the burner F are supported by a framework R in such position that the bottom of the casing D is held closely adjacent to the said burner, and the casing D is provided at its lower end with a depending flange C, which surrounds the burner F and serves to confine the heat of the burner in a space immediately below the bottom of the casing.

It will be seen that the bottom of the casing is held directly in the path of the flame from the burner F, and therefore will be highly heated, so that any fumiferous material deposited thereon will be instantly converted from a solid to a gaseous form. Preferably the fumiferous material is contained in solid form within a supplemental casing or receptacle H, supported within the casing D by suitable supports S. As shown in Fig. 2, the bottom walls of this receptacle H are inclined inwardly toward the discharge-opening at the lower end thereof, and it is provided in its top with an opening or passage normally closed by a cover T, through which the fumiferous material can be introduced.

The central portion of the bottom of the casing D is bent upwardly to form a cone-shaped portion M, the apex of which extends into the discharge-opening at the lower end of the receptacle H, and the material in such receptacle as it escapes from such discharge-opening moves downward along the side walls of said cone. As shown, this cone M is arranged directly over and around the upper end of the burner F, so that the flame from such burner impinges directly on the inner wall of such cone. The heat of the flame causes the material escaping from the receptacle H to be converted into a gaseous form, and as such conversion progresses the weight of material in the said receptacle causes a gradual feeding of the same down over the cone M. The fumes rising from the bottom of the casing D are mingled with air entering such casing through an air-inlet M', and passing around and over the receptacle H escape through a tube E, which projects beyond the cover or top of the said casing and may be connected with a pipe or other distributing means in order that the fumes may be directed or conducted to any desired point.

In order that the fumes escaping from the casing D may contain sufficient moisture, I provide means for introducing water to the casing D and converting the same into steam, which mingles with the gas generated in the fume-chamber.

G designates a tank which in the construction herein illustrated is supported by the casing D and by the vertical pipe or duct through which the liquid fuel is conveyed to the burner F. It is provided with an inlet I at its upper end, and at its lower end communicates with a shallow water-receptacle formed in the bottom of the casing D about the cone-shaped projection M thereof through a valved pipe L. As shown, the water-receptacle is provided by the flange O, extending upward from the bottom plate and situated around the base of the cone-shaped projection M. The pipe L is provided with an upward-extending branch, which is connected by a coupling K with a pipe or air-tube J, that opens into the tank G above the water. When the water in the water-receptacle within the casing D has evaporated down to a line below the top of the pipe L, air enters the latter and passes up through the pipe J into the tank G. By this means the water is automatically maintained at the desired level in the said inner water-receptacle, as an additional supply of water will follow when such bodies of air pass up into the tank.

The water-receptacle within the casing D is in the flame region of the burner, and as it is open at the top the steam passes out readily in large volume toward the fume-receiving chamber in the upper part of the casing.

I am aware that it has been proposed to support a receptacle for fumiferous material inside of a steam-duct leading from an inclosed boiler with the expectation that the heat of the steam would cause the generation of the fumes; but in my construction the material is delivered directly to the highly-heated wall of the fume-generating chamber and the fumes are generated independently of the steam, and as the water is also admitted to a highly-heated surface it is rapidly converted into steam and is intimately mixed in the chamber above with the fumes.

While I have above described the exact details of the form of mechanism shown, and which I at present prefer, it will be understood that there can be more or less modification without departing from the essential features. It will be seen that I provide a unitary structure comprising a burner, a fume-generating chamber in the flame region of the burner, a water-receptacle also in said flame region, a receptacle for the fumiferous material which cannot only hold the latter but is adapted to deliver it gradually in a stream or by charges to the fume-generating chamber, a water tank or receptacle supplemental to the said inner water-receptacle, and a tank or receptacle for holding and supplying liquid fuel to the burner, together with a framework which unites and supports all of the said parts. An efficient and very simple way of forming the fume-generating chamber and the water-receptacle or steam-generator is that illustrated, namely, by having a heating-plate and separating the space above it into two receptacles by means of a rim or flange, as at O, the fume-generating chamber in the construction shown being that space immediately above the heating-plate which is inside of this rim or flange and the water-receptacle being the space above said plate which is outside thereof; but to those acquainted with the constructing of such devices it will be understood that there can be variation as to these matters of detail.

I am also aware that it has been heretofore proposed in the manufacture of sulfuric acid to generate sulfurous fumes by allowing sulfur to fall upon a highly-heated plate or support and to provide for admitting air to the chamber or duct through which the fumes thus generated are conducted to the producer, and therefore I make no claim, broadly, to such a construction; but I believe myself to be the first to have provided a fumigating apparatus of the character herein illustrated and described.

My improved apparatus is especially adapted for household use, and it will be seen that I provide a relatively light apparatus having all of its parts compactly arranged, so as to be readily and easily moved from place to place, and which will require no attention after being set in operation until the supply of fumiferous material contained in the receptacle provided therefor has all been converted into fumes.

What I claim is—

1. In a fumigating apparatus, the combination of a portable frame or support, a vapor-burner supported on said frame, a tank mounted on said frame for supplying liquid fuel to the said burner, a plate supported on said frame to be directly impinged upon by the flame of said burner, and a receptacle supported above said plate for holding fusible fumiferous material and having a reduced passage adapted to deliver said material to said plate, substantially as set forth.

2. In a fumigating apparatus, the combination of a vapor-burner adapted to provide a heating-flame, a plate supported above and partially surrounding said burner, means for holding a supply of fusible fumiferous material and delivering it gradually to said plate, means for delivering water to said plate within the heated area for the generating of steam, and a casing forming a chamber above said plate which receives and mingles the fumes and the steam, substantially as set forth.

3. In a fumigating apparatus, the combination of a vapor-burner, a plate arranged to be directly impinged on by the flame of the burner, a receptacle adapted to hold a mass of fusible fumiferous material and to deliver it to a heated portion of the said plate, a water-receptacle adjacent to and separated from the said last portion of the plate and a casing arranged to provide a duct through which travel the fumes from the said plate and steam from the water-receptacle, substantially as set forth.

4. In a fumigating apparatus, the combination of a vapor-burner, a water-receptacle in the path of the flame and products of combustion from said burner, a heating-plate arranged to be impinged on by the flame of the burner, a casing forming a chamber above said water-receptacle and heating-plate and adapted to receive and commingle fumes from the plate and steam from the water-receptacle, a receptacle adapted to contain a supply of fusible fumiferous material and to deliver the same to the heating-plate, a tank for water, and means for delivering the water to the said water-receptacle, substantially as set forth.

5. In a fumigating apparatus, the combination of the vapor-burner, the heating-plate for fusible fumiferous material in the flame region of said burner, the water-receptacle in said flame region, the receptacle for holding and delivering the fumiferous material, the tank for holding and delivering water to the water-receptacle in the flame region, the receptacle for holding and delivering burning fluid to the burner, and the frame which unites and supports all of the said parts, substantially as set forth.

6. In a fumigating apparatus, the combination of a burner, a receptacle supported above the burner to contain fusible fumiferous material and having a reduced passage-way through which the material can be delivered, and a casing surrounding said receptacle and partly surrounding the burner, to provide a fume-generating chamber adjacent to the burner and a fume collecting and discharging chamber above said generating-chamber, substantially as set forth.

7. In a fumigating apparatus, the combination of a burner, a receptacle for fusible fumiferous material supported above the burner and having a discharge-opening at its lower end, a heating-plate arranged in the path of the flame of the burner and having on its upper surface a conical projection extending into the discharge-opening in said receptacle, and a casing forming a fume-generating chamber about said projection on the plate and a fume-collecting chamber communicating therewith, substantially as set forth.

8. In a fumigating apparatus, the combination of a burner, a plate or support in the flame region of the burner, a receptacle for fusible fumiferous material adapted to deliver said material gradually to said plate, and a casing surrounding said receptacle and forming a fume-generating chamber at its lower end, adjacent to said plate, and a fume-receiving chamber at its upper end, said casing having one or more air-inlets, communicating with the fume-receiving chamber, and a reduced discharge-opening in its top wall above the receptacle for fumiferous material, substantially as set forth.

9. In a fumigating apparatus, the combination of a burner, the casing forming a fume-generating chamber having a wall or walls in the flame region of the burner, the water-receptacle adapted to be heated by the burner, the receptacle for fusible fumiferous material, the water-tank supplemental to the aforesaid water-receptacle, and the air-pipe interposed between the said water-receptacle and the tank, substantially as set forth.

10. In a fumigating apparatus, the combination of the burner, the heating-plate above the burner, the ring or flange, O, secured to said plate and forming on the upper side of the plate two separate receptacles, one for fusible fumiferous material and one for water, the casing above said plate inclosing a fume and steam chamber, a water-receptacle supplemental to and outside of said water-chamber, means for holding fusible fumiferous material and supplying it to one of the receptacles separated by the said ring or flange, O, and a duct for delivering water to the other of said receptacles, substantially as set forth.

In testimony whereof I have signed my name to this specification in the presence of two subscribing witnesses.

THOS. F. MOSS.

Witnesses:
C. A. DISNEY,
A. J. GOSS.